United States Patent
Cao et al.

(10) Patent No.: US 9,634,476 B1
(45) Date of Patent: Apr. 25, 2017

(54) APPARATUS FOR BREAKING LINE BIDIRECTIONAL CURRENT AND CONTROL METHOD THEREOF

(71) Applicants: NR ELECTRIC CO., LTD, Nanjing (CN); NR ENGINEERING CO., LTD, Nanjing (CN)

(72) Inventors: Dongming Cao, Nanjing (CN); Taixun Fang, Nanjing (CN); Yu Wang, Nanjing (CN); Hao Yang, Nanjing (CN); Bing Yang, Nanjing (CN); Wei Shi, Nanjing (CN); Wei Lu, Nanjing (CN)

(73) Assignees: NR ELECTRIC CO., LTD, Nanjing (CN); NR ENGINEERING CO., LTD, Nanjing (CN)

( * ) Notice: Subject to any disclaimer, the term of this patent is extended or adjusted under 35 U.S.C. 154(b) by 0 days.

(21) Appl. No.: 15/119,730

(22) PCT Filed: Dec. 27, 2013

(86) PCT No.: PCT/CN2013/090613
§ 371 (c)(1),
(2) Date: Aug. 18, 2016

(87) PCT Pub. No.: WO2014/117613
PCT Pub. Date: Aug. 7, 2014

(30) Foreign Application Priority Data

Jan. 31, 2013 (CN) .......................... 2013 1 0037475

(51) Int. Cl.
*H02H 3/08* (2006.01)
*H02H 3/087* (2006.01)
(Continued)

(52) U.S. Cl.
CPC ............ *H02H 3/021* (2013.01); *H01H 9/542* (2013.01); *H01H 9/548* (2013.01); *H01H 33/596* (2013.01); *H02H 3/08* (2013.01)

(58) Field of Classification Search
CPC ................................ H02H 3/08; H02H 3/087
(Continued)

(56) References Cited

U.S. PATENT DOCUMENTS

| 9,065,326 | B2 * | 6/2015 | Hafner | ................... H02M 1/092 |
| 2012/0299393 | A1 * | 11/2012 | Hafner | ................... H01H 9/542 307/113 |

(Continued)

FOREIGN PATENT DOCUMENTS

| CN | 102656656 A | 9/2012 |
| CN | 102687221 A | 9/2012 |

(Continued)

*Primary Examiner* — Dharti Patel
(74) *Attorney, Agent, or Firm* — Gokalp Bayramoglu

(57) ABSTRACT

An apparatus for breaking a line bidirectional current and a control method therefore. The apparatus comprises a breaking current branch circuit and an on-state current branch circuit, the breaking current branch circuit comprises one nonlinear resistor being connected in parallel to one first power semiconductor device, or one nonlinear resistor being connected in parallel to at least two first power semiconductor devices mutually connected in series; and the on-state current branch circuit comprises at least one bidirectional power semiconductor switch being connected in series to at least one high-speed isolation switch. The apparatus also comprises a bridge-type branch circuit. An apparatus for breaking a line bidirectional current, thereby greatly reducing costs of the apparatus and reducing difficulty in device layout, mounting and wiring of the apparatus on the premise of ensuring a breaking speed that is quick enough and a low loss.

12 Claims, 5 Drawing Sheets

(51) Int. Cl.
*H02H 3/02* (2006.01)
*H01H 33/59* (2006.01)
*H01H 9/54* (2006.01)

(58) Field of Classification Search
USPC .................................................... 361/93.1
See application file for complete search history.

(56) References Cited

U.S. PATENT DOCUMENTS

2014/0355158 A1* 12/2014 Metzner .............. H04L 25/0272
361/63
2015/0236498 A1* 8/2015 Davidson ................ H02H 7/12
361/57

FOREIGN PATENT DOCUMENTS

| CN | 102780200 A | 11/2012 |
| CN | 202650895 U | 1/2013 |
| EP | 0867998 B1 | 9/1998 |

* cited by examiner

APPARATUS FOR BREAKING LINE BIDIRECTIONAL CURRENT AND CONTROL METHOD THEREOF

FIELD OF THE INVENTION

The present invention relates to an apparatus for breaking a line bidirectional current flowing and a control method for the apparatus.

BACKGROUND

In a multi-end DC (DC) power transmission system, a high-voltage DC circuit breaker is one of the most important devices. In the multi-end DC power transmission system, because a voltage level is high and the line resistance is low, once a line short-circuit fault occurs, a DC power transmission network and an alternating-current (AC) network are affected soon, and the fault must be cleared quickly. Therefore, the high-voltage DC circuit breaker needs to act fast and be able to reduce the fault duration to the greatest extent or suppress a faulty current, thereby reducing an attack of the fault on the AC/DC power transmission network. Because the high-voltage DC circuit breaker is connected in series to the power transmission line, in addition to that the circuit breaker is required to have a relatively high speed of switching on/off a circuit, the circuit breaker is required to have a loss as less as possible. A direction of a current in the high-voltage DC power transmission line is not determined, and the current may have two directions. Therefore, a circuit breaker is generally required to be able to distinguish DC current in two directions.

In the Chinese patent application CN102780200A, a conventional high-voltage DC circuit breaker is used to break a DC current, and a structure of the conventional high-voltage DC circuit breaker is constituted by three parts: an AC circuit breaker, an LC oscillation circuit, and an energy consumption element. After being opened, the AC circuit breaker generates an electric arc, the voltage of the electric arc resonates in the LC oscillation circuit, and when an oscillating current peak value reaches a magnitude of the DC current, the oscillating current can counterbalance the DC current, so that a zero crossing occurs at a port of the circuit breaker, so as to help extinguish the electric arc, thereby achieving the objective of switching off the DC current. Such a breaking manner may break a current in two directions and has an excessively small loss in normal working. However, an arc extinguishing time of a conventional high-voltage DC circuit breaker is relatively long, which is about tens of milliseconds, so that a requirement of quickly isolating a fault of a multi-end DC power transmission system cannot be satisfied.

In the European patent EP0867998B1, a solid-state circuit breaker structure based on a semiconductor device is proposed and can be constituted by a switchable semiconductor device group and an energy consumption element. The switchable semiconductor device group is constituted by multiple low-voltage switchable semiconductor elements, and because a breaking speed of the switchable semiconductor device is extremely high, which is microsecond-scaled, a DC faulty current can be quickly switched off in this manner. However, because an on-state voltage drop of a semiconductor device group is great, a power transmission loss is increased, and power transmission efficiency is lowered.

In order to satisfy requirements of quickly isolating a DC faulty current and maintaining relatively high power transmission efficiency, the Chinese patent application CN102687221A discloses an apparatus and a method for breaking an electrical current of a power transmission or distribution line and a current limiting arrangement. A main circuit breaker, a high-speed switch, an auxiliary circuit breaker, and a non-linear resistor energy consumption element are included. In normal working mode, a line current flows through an auxiliary circuit and has a small on-state loss; and in faulty mode, the current is commutated to the main circuit breaker, and finally, the energy consumption element absorbs a breaking capability.

After a high-voltage DC circuit-breaking apparatus switches off a faulty current, the main circuit breaker withstands the voltage of several hundred kV, and the number of power semiconductor devices connected in series in one current direction can easily reach several hundreds. Because the power semiconductor device can only be conducted in a single direction, in order to switch off a faulty current in two current directions, a basic series-connection unit in the main circuit breaker in the high-voltage DC circuit breaking apparatus uses an anti-parallel or anti-series connection structure of two power semiconductor devices, and a number of power semiconductor devices in the main circuit breaker is doubled. During breaking in a first current direction, power semiconductor devices in a second current direction do not produce a beneficial effect on breaking the current or withstanding the voltage, which is equivalent to that a utilization ratio of the power semiconductor devices of the main circuit breaker is only 50%. Because costs of the power semiconductor devices occupy a large proportion of the total costs of the apparatus, in order to implement a function of breaking a current in two directions, costs of the apparatus are increased considerably.

Not only the increase of the power semiconductor devices in the second current direction in the main circuit breaker do not produce a beneficial effect, but also the power semiconductor devices in the second current direction are subject to the disadvantageous influence of overvoltage and overcurrent generated when the breaking occurs in the first direction. If the power semiconductor devices in the second current direction and the power semiconductor devices in the first current direction are in anti-parallel connection, when the breaking occurs in the first current direction, overvoltage is applied to the power semiconductor devices in the second current direction, and this voltage is a reverse voltage to the power semiconductor devices in the second current direction and would cause damage to the devices; and if the power semiconductor devices with an anti-parallel diode in the second current direction and the power semiconductor devices with an anti-parallel diode in the first current direction are connected in series in opposite directions, an excessively high abrupt current generated in the breaking process in the first current direction would flow through a freewheeling diode in the power semiconductor devices in the second current direction, which also exerts disadvantageous influence on the service life of the device.

The increased power semiconductor devices in the second current direction would also exert disadvantageous influence on the structural design and electrical design, and the power semiconductor devices in the first current direction have a consistent arrangement direction, so that the electric design and the structural design have consistency. The increase of the power semiconductor devices in the second current direction ruins the consistency in the original arrangement direction, resulting in increased difficulty in device layout, mounting, and wiring.

SUMMARY

Technical Problem

An objective of the present invention is to propose an apparatus for breaking a line bidirectional current and a control method therefor, thereby greatly reducing costs of the apparatus and reducing difficulty in device layout, mounting and wiring of the apparatus on the premise of ensuring a breaking speed that is quick enough and a low loss.

Technical Solution

In order to achieve the foregoing objective, the solutions used in the present invention are:

An apparatus for breaking a line bidirectional current includes a breaking current branch circuit and an on-state current branch circuit, where the breaking current branch circuit includes one nonlinear resistor being connected in parallel to one first power semiconductor device, or one nonlinear resistor being connected in parallel to at least two first power semiconductor devices mutually connected in series; and the on-state current branch circuit includes at least one bidirectional power semiconductor switch being connected in series to at least one high-speed isolation switch, where:

the apparatus also includes a bridge-type branch circuit, and the bridge-type branch circuit includes two bridge arms constituted by four identical current commutation branch circuits, each current commutation branch circuit comprising at least one second power semiconductor device connected in series; every two of the four commutation branch circuits are connected in series a same direction, and the formed two bridge arms are further connected in parallel; and a connection relationship of the apparatus is any one of the following four:

a) the apparatus includes a breaking current branch circuit, an on-state current branch circuit, and a bridge-type branch circuit, where two ends of the on-state current branch circuit are respectively connected to bridge arm middle points of two bridge arms of the bridge-type branch circuit, and the two bridge arms are both connected in parallel to the breaking current branch circuit;

b) the apparatus includes at least two groups of a breaking current branch circuit, an on-state current branch circuit, and a bridge-type branch circuit, where in each group, two ends of the on-state current branch circuit are respectively connected to bridge arm middle points of two bridge arms of the bridge-type branch circuit, and the two bridge arms are both connected in parallel to the breaking current branch circuit; and all the on-state current branch circuits are connected in series in sequence;

c) the apparatus includes an on-state current branch circuit and at least two groups of a breaking current branch circuit and a bridge-type branch circuit, where in each group, two bridge arms of the bridge-type branch circuit are both connected in parallel to corresponding breaking current branch circuits, and bridge arm middle points of the bridge-type branch circuit in each group are connected in series in sequence; and two ends of the on-state current branch circuit are respectively connected to bridge arm middle points of end portions of the first bridge-type branch circuit and the last bridge-type branch circuit in the circuits connected in series; and d) the apparatus includes an on-state current branch circuit, a bridge-type branch circuit, and at least two breaking current branch circuits, where after being connected in series in sequence, the respective breaking current branch circuits are further connected in parallel to two bridge arms of the bridge-type branch circuit, and two ends of the on-state current branch circuit are respectively connected to bridge arm middle points of the two bridge arms of the bridge-type branch circuit.

The foregoing first power semiconductor device has a capability of switching on/off a current.

The foregoing second power semiconductor device does not have a capability of switching on/off a current.

The bidirectional power semiconductor switch includes third and fourth power semiconductor devices that are connected in parallel to each other, and directions of current switches of the third and fourth power semiconductor devices are opposite to each other.

The bidirectional power semiconductor switch includes two power semiconductor devices and two diodes, where a fifth power semiconductor device is connected in parallel to a first diode, and directions of current switches of the two are opposite to each other; a sixth power semiconductor device is connected in parallel to a second diode, and directions of current switches of the two are opposite to each other; and the two parallel connections are connected in series, directions of the current switches of the fifth and sixth power semiconductor devices are opposite to each other, and directions of the current switches of the first and second diodes are opposite to each other.

The commutation branch circuit also includes at least one second high-speed isolation switch, and the second high-speed isolation switch and the second power semiconductor device are connected in series to each other.

A control method for an apparatus for breaking a line bidirectional current defines that two connection points between the on-state current branch circuit and the bridge-type branch circuit in the apparatus are respectively two ends of the apparatus, and the apparatus is connected in series to a current path of a line by using the two ends, where: the first high-speed isolation switch and the bidirectional power semiconductor switch in the on-state current branch circuit are closed, the second power semiconductor device in the bridge-type branch circuit is closed, and the first power semiconductor device in the breaking current branch circuit is closed; and the control method includes the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then switching off the first high-speed isolation switch of the on-state current branch circuit; and then if a switch-off signal of the breaking current branch circuit is received, switching off the first power semiconductor device in the breaking current branch circuit, so as to commutate a current to the nonlinear resistor.

A control method for an apparatus for breaking a line bidirectional current defines that two connection points between the on-state current branch circuit and the bridge-type branch circuit in the apparatus are respectively two ends of the apparatus, and the apparatus is connected in series to a current path of a line by using the two ends, where: the first high-speed isolation switch and the bidirectional power semiconductor switch in the on-state current branch circuit are closed, the second power semiconductor device and the second high-speed isolation switch in the bridge-type branch circuit are closed, and the first power semiconductor device in the breaking current branch circuit is closed; and the control method includes the following steps if a switch-off signal of the on-state current branch circuit is received, switching off the bidirectional power semiconductor switch of the on-state current branch circuit, so as to commutate a current to the bridge-type branch circuit and the breaking current branch circuit;

then, switching off the first high-speed isolation switch of the on-state current branch circuit; determining, on a bridge arm connected to a current input end, a second power semiconductor device of a cathode directly or indirectly connected to the current input end, and switching off a second high-speed isolation switch of a commutation branch circuit on which the second power semiconductor device is located; and determining, on a bridge arm connected to a current output end, a second power semiconductor device of an anode directly or indirectly connected to the current output end, and switching off a second high-speed isolation switch of a commutation branch circuit on which the second power semiconductor device is located;

then if a switch-off signal of the breaking current branch circuit is received, switching off the first power semiconductor device in the breaking current branch circuit, so as to commutate a current to the nonlinear resistor; and switching off the second high-speed isolation switch that is in a closed state in the bridge-type branch circuit to complete an entire breaking process.

Advantageous Effect

After using the foregoing solutions, the present invention has the following features:

(1) A low on-state loss: When a line works normally, a line current flows through a high-speed isolation switch having nearly zero impedance and an on-state current branch circuit constituted by a few power semiconductor devices having an extremely small conduction voltage drop. Because a current commutation branch circuit and a breaking current branch circuit need a higher conduction voltage drop, almost no current flows through them, and it is unnecessary to additionally mount a cooling system for the current commutation branch circuit. A total loss of the apparatus is extremely low.

(2) As compared with a conventional high-voltage DC circuit breaker, the apparatus has a higher breaking speed, and uses a power semiconductor device as a current breaking execution unit, which is excessively fast, where a breaking speed of a general power semiconductor device is merely tens of microseconds and can be ignored. A total breaking time of the apparatus is mainly a breaking time of a high-speed isolation switch. Currently, a breaking time of a high-speed isolation switch may reach 1 to 3 ms, and it could be predicted that the total breaking time of the apparatus is about 3 to 5 ms, which is far higher than the breaking speed of the conventional high-voltage DC circuit breaker.

(3) Bidirectional current breaking is implemented with relatively low costs: In the present invention, the breaking current branch circuit is constituted by power switch devices connected in series in a same current direction, and by means of the current commutation branch circuit, a bidirectional current in the line flows through the breaking current branch circuit in the same direction. When the line current is in a first current direction, the direction of the current commutation branch circuit (A, D) is consistent with the first current direction, the direction of the power semiconductor devices in the current commutation branch circuit (B, C) is opposite to the first current direction, and the power semiconductor devices are in a reverse cut-off state. When the line current is in a second current direction, the direction of the current commutation branch circuit (B, C) is consistent with the second current direction, the direction of the power semiconductor devices in the current commutation branch circuit (A, D) is opposite to the second current direction, and the power semiconductor devices are in a reverse cut-off state. Hence, when the line current directions are different, directions of the currents flowing through the breaking current branch circuit are consistent. The current commutation branch circuit may have two composition manners: one manner is connecting a few power semiconductor devices in series to one high-speed isolation switch, where the high-speed isolation switch is configured to isolate a relatively high switch-off voltage, and the other manner is connecting a greater number of power semiconductor devices in series to withstand a high switch-off voltage. In the present invention, the first solution is preferred, particularly, in a scenario where the voltage is excessively high. The current commutation branch circuit includes a few power semiconductor devices and four groups of high-speed isolation switches in total, the number of power semiconductor devices is excessively small, and the costs are low. The high-speed isolation switches are separated only in a no-current state, it is unnecessary to extinguish an electrical arc, only an effect of isolating a voltage is produced, and the costs are low. As compared with the patent CN102687221A, the total costs are reduced considerably, the utilization efficiency of the power semiconductor devices in the apparatus is improved, and meanwhile, a disadvantage of the patent CN102687221A in implementing a bidirectional function is avoided.

(4) The control method is used to when a current reaches a limit value, add a specific number of nonlinear resistors to the line by means of operation to produce effects of changing the impedance of the line and limiting the rise of the faulty current, which is an extension of application of the apparatus and has the advantages of the apparatus.

DETAILED DESCRIPTION

The technical solutions of the present invention are described in detail below with reference to the accompanying drawings and specific embodiments.

Figure 1:
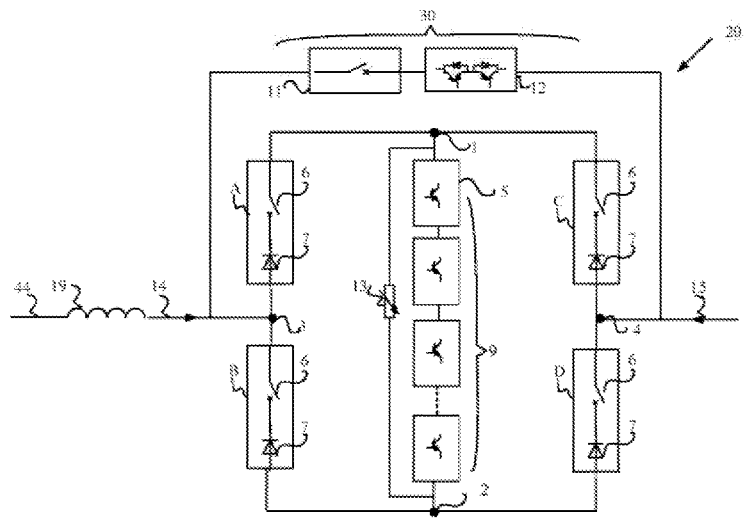
FIG. 1 is a diagram of an apparatus for breaking a line bidirectional current according to the present invention.

As shown in FIG. 1, the present invention provides an apparatus 20 for breaking a line bidirectional current, including a breaking current branch circuit 9 and an on-state current branch circuit 30, where the breaking current branch circuit 9 includes one nonlinear resistor 13 being connected in parallel to one first power semiconductor device 5, or one nonlinear resistor 13 being connected in parallel to at least two first power semiconductor devices 5 mutually connected in series; and the on-state current branch circuit 30 includes at least one bidirectional power semiconductor switch 12 being connected in series to at least one high-speed isolation switch 11, and when there are at least two bidirectional power semiconductor switches 12 and at least two high-speed isolation switches 11, the connection relationships thereof are mutual series connections.

The apparatus also includes four current commutation branch circuits A, B, C, D, where the four commutation branch circuits have the identical structure, type of constituent device, and parameter, each commutation branch circuit includes at least one power semiconductor device 7 being connected in series to at least one high-speed isolation switch 6. When there are at least two power semiconductor devices 7, a connection relationship therebetween is a series connection in the same direction, and when there are at least two high-speed isolation switches 6, a connection relationship therebetween is a mutual series connection or an indirect series connection. Every two of the four commutation branch circuits are connected in series in the same direction, and the two parallel connections are further connected in parallel. In this embodiment, the commutation branch circuits A, B are connected in series in the same direction to constitute a bridge arm, and the commutation branch circuits C, D are connected in series in the same direction to constitute another bridge arm. The two bridge arms are further connected in parallel, and the so-called "series connection in the same direction" is specifically directed to the power semiconductor devices 7.

A connection relationship of the apparatus is: an end of the on-state current branch circuit 30 is connected to a middle point 3 of a bridge arm constituted by the commutation branch circuits A, B, and a direction in which a current enters from the outside to the connection point is defined as a first current direction 14; another end of the on-state current branch circuit 30 is connected to a middle point 4 of a bridge arm constituted by the commutation branch circuits C, D, and a direction in which a current enters from the outside to the connection point is defined as a second current direction 15; the two bridge arms are both connected in parallel to the breaking current branch circuit 9; and an input end of the apparatus 20 is also connected to an end of a current limiting reactor 19 to form a series connection, and a current limiting reactor 10 is configured to limit the rise of a short-circuit current.

In this embodiment, the power semiconductor device 5 in the breaking current branch circuit 9 needs to have a capability of switching on/off a current, where a gate switchable device such as an IGBT, an IEGT, or a GTO, may be used; and the power semiconductor device 7 in the commutation branch circuit does not need to have a capability of switching on/off a current, where a diode may be used.

Figure 2:
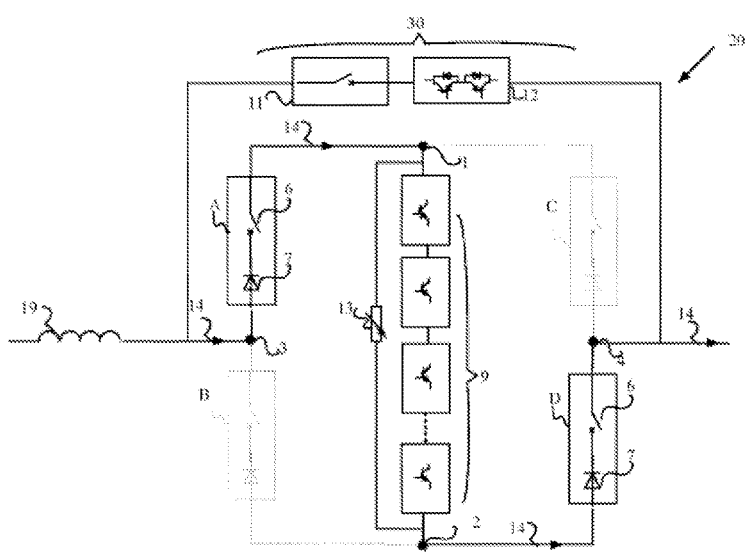
FIG. 2 is a diagram illustrating a correspondence between a first current direction and a direction of a power semiconductor device.
Figure 3:
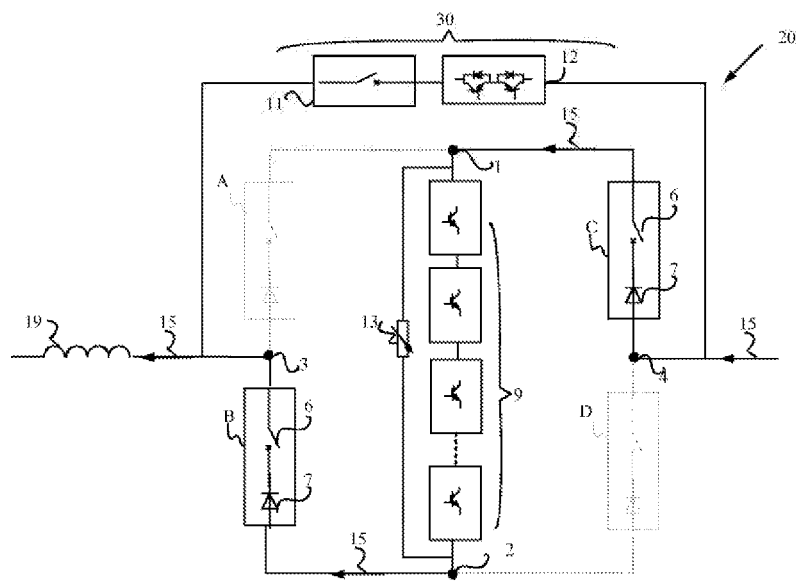
FIG. 3 is a diagram illustrating a correspondence between a second current direction and a direction of a power semiconductor device.

Both of the commutation branch circuits A, D include at least one high-speed isolation switch 6 being connected in series to at least one power semiconductor device 7 in the first current direction 14, and a correspondence between the current direction and the direction of the power semiconductor device 7 is shown in FIG. 2; and both of the current commutation branch circuits B, C include at least one high-speed isolation switch 6 being connected in series to at least one power semiconductor device 7 in the second current direction 15, and a correspondence between the current direction and the direction of the power semiconductor device 7 is shown in FIG. 3. Using such an arrangement manner is using a unidirectional conduction characteristic of a power semiconductor device, so as to enable a bidirectional current in a line to flow through the breaking current branch circuit 9 in the same direction, for example, from a node 1 to a node 2 in FIG. 1.

Figure 4:
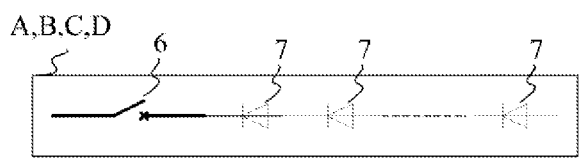
FIG. 4 is a first illustrative diagram of a current commutation branch circuit.

The four commutation branch circuits are all constituted by high-speed isolation switches 6 being connected in series to power semiconductor devices 7, as shown in FIG. 4. A main function of a high-speed isolation switch 6 is isolating a voltage. After breaking of the breaking current branch circuit 9, an excessively high breaking voltage is generated between the node 1 and the node 2, and this voltage is applied to the commutation branch circuit. The high-speed isolation switch 6 may withstand an excessively high breaking voltage, so that the power semiconductor device 7 in the commutation branch circuit only needs to withstand an excessively low breaking voltage. A few devices are required to be connected in series. Such a manner saves costs of the apparatus.

Figure 5:
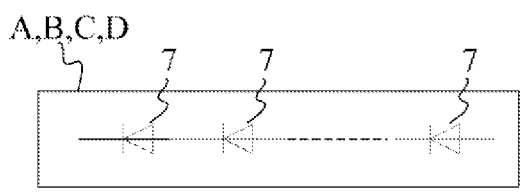
FIG. 5 is a second illustrative diagram of the current commutation branch circuit.

The four commutation branch circuits may also be replaced in a manner as shown in FIG. 5. In an optional manner, the commutation branch circuit may be a series connection constituted by at least one power semiconductor device 7. In such a manner, a high-speed isolation switch is omitted, but the series connection of the power semiconductor device 7 needs to be able to withstand an excessively high voltage, so a great number of devices being connected in series are needed.

The power semiconductor devices 7 in the commutation branch circuit may be connected in parallel in the same direction, so as to improve a current withstanding capability of the commutation branch circuit.

The apparatus 20 is connected in series to a line 44, the on-state current branch circuit 30 merely has a few power semiconductor devices, and a conduction voltages drop is less. In a normal state, when a line current flows through the on-state current branch circuit 30, an excessively small loss is generated.

Figure 9:
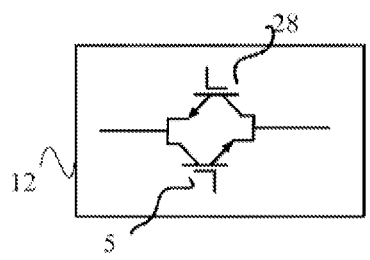
FIG. 9 is a first embodiment of a bidirectional power semiconductor switch in the present invention.

The on-state current branch circuit 30 is constituted by at least one bidirectional power semiconductor switch 12 and a high-speed isolation switch 11, where the bidirectional power semiconductor switch 12 includes a parallel connection between the power semiconductor device 5 in the first current direction 14 and the power semiconductor device 28 in the second current direction 15, as shown in FIG. 9.

Figure 10:
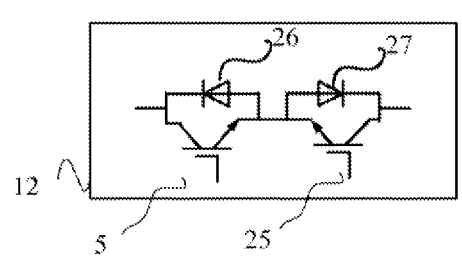
FIG. 10 is a second embodiment of the bidirectional power semiconductor switch in the present invention.

The bidirectional power semiconductor switch 12 may be of another structure, including a first parallel connection between the power semiconductor device 5 in the first current direction 14 and the power semiconductor device 28 in the second current direction 15 and a second parallel connection between the power semiconductor device 25 in the second current direction 15 and the power semiconductor device 27 in the first current direction 15, as shown in FIG. 10.

An arrangement direction of the power semiconductor device 5 in the breaking current branch circuit 9 of the apparatus 20 is always consistent with a line current direction, as shown in FIG. 2 and FIG. 3, and the current direction in the breaking current branch circuit 9 is from the node 1 to the node 2. As compared with the on-state current branch circuit 30, the breaking current branch circuit 9 has a higher voltage blocking capability, and main effects of the breaking current branch circuit 9 are switching off a current in the line and being able to withstand a relatively high breaking voltage. A branch circuit includes a lot of series connections of power semiconductor devices 5, and after a breaking instruction is received, breaking is performed on the power semiconductor devices 5 simultaneously. After the breaking, a breaking voltage is generated between the node 1 and the node 2, the high voltage enables impedance of the nonlinear resistor 13 connected in parallel to the two ends of the branch circuit to change. Finally, the current is commutated to the nonlinear resistor 13, and the energy is absorbed by the nonlinear resistor 13.

The power semiconductor devices 5 in the breaking current branch circuit 9 may be connected in parallel in the same direction, so as to improve a current withstanding capability of the branch circuit.

The present invention also includes a control method for the apparatus 20 for breaking a line bidirectional current, where the apparatus 20 is connected in series to a current path of the line 44, where the high-speed isolation switch 11 and the bidirectional power semiconductor switch 12 in the on-state current branch circuit 30 in the apparatus 20 are closed, the high-speed isolation switches 6 and power semiconductor devices 7 of the four commutation branch circuits A, B, C, D are closed, and the power semiconductor device 5 in the breaking current branch circuit 9 is closed; and the control method includes the following steps:

if a switch-off signal of the on-state current branch circuit 30 is received, switching off the bidirectional power semiconductor switch 12 of the on-state current branch circuit 30, so as to commutate a current to the commutation branch circuits A, B, C, D and the breaking current branch circuit 9;

then determining a current direction of the line 44, and if the current direction is the first current direction 14, switching off the high-speed isolation switches 6 of the current commutation branch circuits B, C and the high-speed isolation switch 11 of the on-state current branch circuit 30 simultaneously, where when the current direction is the first current direction 14, as shown in FIG. 2, the current commutation branch circuits B, C and the on-state current branch circuit 30 withstand a high breaking voltage generated by breaking of the breaking current branch circuit 9, so before the breaking of the breaking current branch circuit 9, it is necessary to separate the current commutation branch circuits B, C from the high-speed isolation switch 11 of the on-state current branch circuit 30, so as to prevent the power semiconductor device of the branch circuit from being damaged because of withstanding the high breaking voltage; moreover, the current commutation branch circuits A, D and the breaking current branch circuit 9 are in a series connection, through which a breaking current flows, but would not withstand a high breaking voltage, and should be kept in a closed state;

if the current direction is the second current direction 15, switching off the high-speed isolation switches 6 of the current commutation branch circuits A, D and the high-speed isolation switch 11 of the on-state current branch circuit 30 simultaneously, where when the current direction is the second current direction 14, as shown in FIG. 3, the current commutation branch circuits A, D and the on-state current branch circuit 30 would withstand a high breaking voltage generated by breaking of the breaking current branch circuit 9, so before the breaking of the breaking current branch circuit 9, it is necessary to separate the current commutation branch circuits A, D from the high-speed isolation switch 11 of the on-state current branch circuit 30, so as to prevent the power semiconductor device of the branch circuit from being damaged by the high breaking voltage; moreover, the current commutation branch circuits B, C and the breaking current branch circuit 9 are in a series connection, through which a breaking current flows, but would not withstand a high breaking voltage, and should be kept in a closed state;

then if a switch-off signal of the breaking current branch circuit 9 is received, switching off the power semiconductor device 5 in the breaking current branch circuit, so as to commutate a current to the nonlinear resistor 13; and when determining that the line current is reduced to zero, switching off the high-speed isolation switches 6 that are in a closed state in the current commutation branch circuits A, B, C, D to complete an entire breaking process.

The present invention further has several other implementation structures, which are briefly described below.

Figure 6:
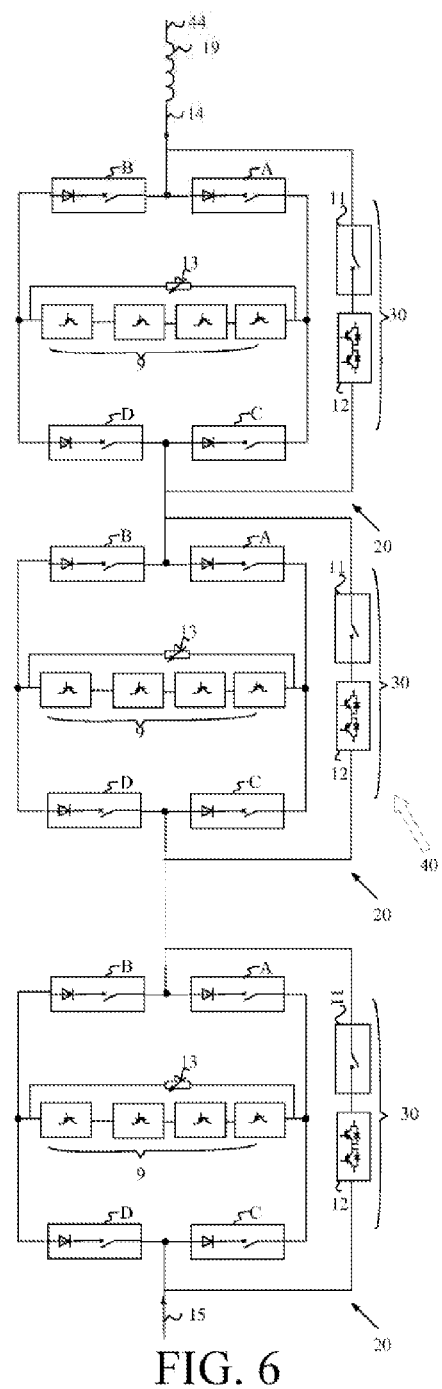
FIG. 6 illustrates another embodiment of the present invention.

As shown in FIG. 6, an apparatus 40 includes at least two apparatuses 20 that are mutually connected in series and that are connected in series to the current path of the line 44, where the apparatus 40 is suitable for, when the current in the current path exceeds a current limit, controlling a specific number of the at least two apparatuses 20, so as to commutate a flowing current that passes through the on-state current branch circuits 30 of the at least two apparatuses 20 to the nonlinear resistor 13.

Figure 7:
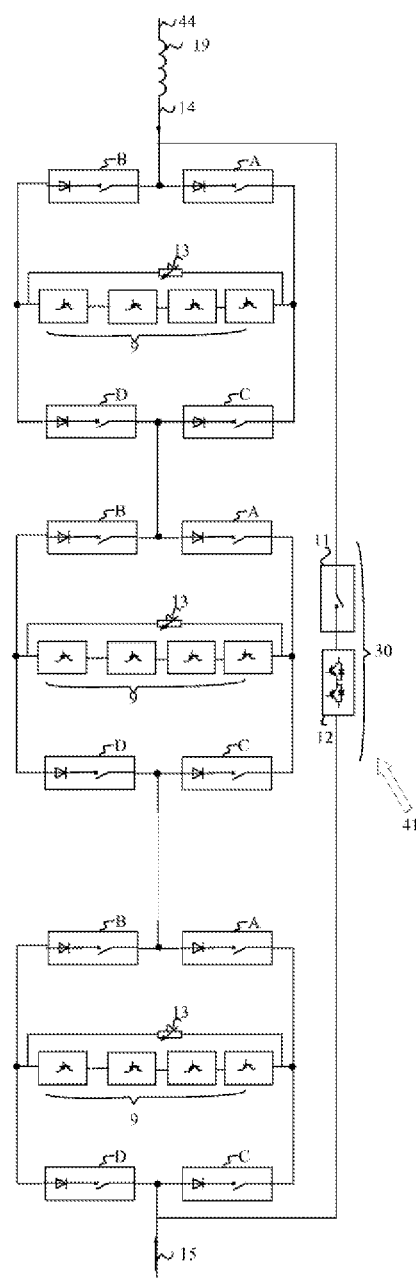
FIG. 7 illustrates still another embodiment of the present invention.

As shown in FIG. 7, the apparatus 41 connected in series to the line 44 includes at least two current commutation branch circuits A, B and current commutation branch circuits C, D being connected in parallel to the breaking current branch circuit 9, where the parallel connections are mutually connected in series, and the series connection is connected in parallel to the on-state current branch circuit 30. When the current in the current path exceeds a current limit, operation is performed on the on-state current branch circuit 30 and a specific number of the at least two current commutation branch circuits A, B, and the parallel connections between the current commutation branch circuits C, D and the breaking current branch circuit 9 enable the current that passes through the on-state current branch circuit 30 to be commutated to the nonlinear resistors 13 in the at least two parallel connections.

Figure 8:
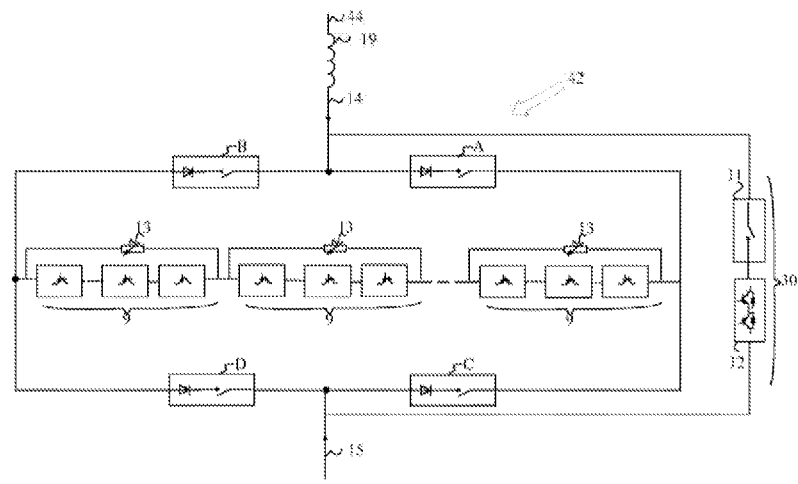
FIG. 8 illustrates further another embodiment of the present invention.

As shown in FIG. 8, an apparatus 42 connected in series to the line 44 includes a series connection of at least two breaking current branch circuits 9, where the breaking current branch circuit 9 includes at least one power semiconductor device 5 being connected in parallel to a nonlinear resistor 13 and further includes an on-state current branch circuit 30 constituted by at least one bidirectional power semiconductor switch 12 and at least one high-speed isolation switch 11 that are connected in series; further includes current commutation branch circuits A, B, C, D, where each of the current commutation branch circuits A, B, C, D includes a series connection between at least one power semiconductor device 7 and at least one high-speed isolation switch 6, an end of the on-state current branch circuit 30 is connected to a middle point 3 of a bridge arm constituted by the current commutation branch circuits A, B, another end of the on-state current branch circuit 30 is connected to a middle point 4 of a bridge arm constituted by the current commutation branch circuits C, D, and series connections between the two bridge arms and the at least two breaking current branch circuits 9 constitute a parallel connection.

When the current in the current path exceeds a current limit, operation is performed on series connections between the on-state current branch circuit 30 and a specific number of the at least two breaking current branch circuits 9, so as to commutate the current that passes through the on-state current branch circuit 30 to the nonlinear resistor 13 connected in series to the at least two breaking current branch circuits 9.

A specific implementation manner of the present invention is described by using an embodiment:

The apparatus 20 is designed to be able to break a bidirectional current of a ±400 kV high-voltage DC power transmission line, and a current breaking capability is 2 kA.

As shown in FIG. 1, an apparatus 20 for breaking the line bidirectional current includes a breaking current branch circuit 9, current commutation branch circuits A, B, C, D, and an on-state current branch circuit 30, where the breaking current branch circuit 9 shall at least be able to withstand a breaking voltage of 800 kV, in consideration of a specific allowance, the design is performed according to a breaking voltage of 1200 kV, and two 4.5 kV/1.6 kA IGBTs are connected in parallel to serve as a unit device, and in consideration of an uneven voltage that may occur at a critical moment, a specific allowance shall be reserved in the voltage-resistance design on the device, so 400 unit devices are needed to be connected in series to constitute an IGBT valve group, where a total number of devices is 800. The arrangement directions of all IGBTs are consistent.

The on-state current branch circuit 30 includes a bidirectional power semiconductor switch 12 being connected in series to a high-speed isolation switch 11, where the high-speed isolation switch 11 requires a relatively high breaking speed, and a port after the breaking can withstand a voltage of 1200 kV. The IGBTs with 4.5 kV/1.6 kA freewheeling diodes are connected in parallel in reverse to constitute a unit device, and the on-state circuit branch circuit 30 needs three unit devices in total, which are connected in series and then connected parallel to constitute a valve group. Six unit devices are needed in total, and a total number of devices is 12. The IGBTs and the freewheeling diodes are arranged in two directions. The on-state current branch circuit 30 is connected to the bridge arm middle point 3 and bridge arm middle point 4 on the two ends of the line.

The apparatus 20 further includes current commutation branch circuits A, B, C, D, where the commutation branch circuits A, B constitute a first bridge arm with a middle point connected to the bridge arm middle point 3 of the line, the commutation branch circuits C, D constitute a second bridge arm with a middle point connected to the bridge arm middle point 4 of the line, and the two bridge arms are both connected in parallel to the breaking current branch circuit 9.

The apparatus 20 needs four current commutation branch circuits in total, devices of the branch circuits are the same, and each branch circuit includes a power semiconductor device 7 and a high-speed isolation switch 6. A technical requirement on the high-speed isolation switch 6 is basically consistent with that on the on-state current branch circuit 30. The power semiconductor device 7 only needs to withstand an excessively small breaking voltage, and a few series connections are needed. A 4.5 kV/1.6 kA diode is selected as the power semiconductor device 7, and three diodes in total are needed to be connected in series and then connected in parallel to constitute a diode group. Each branch circuit needs six diodes, four current commutation branch circuits need 24 diodes in total, and the arrangement directions of diodes are shown in FIG. 2 and FIG. 3.

The control method includes the following steps:

In a normal situation, the high-speed isolation switch 11 and the bidirectional power semiconductor switch 12 in the on-state current branch circuit 30 of the apparatus 20 are closed, the high-speed isolation switches 6 and the power semiconductor devices 7 in the current commutation branch circuits A, B, C, D are closed, and the power semiconductor device 5 in the breaking current branch circuit 9 is closed. Because the on-state current branch circuit 30 only includes three IGBT series connections, while the breaking current branch circuit 9 includes 400 IGBT series connections, a rated voltage blocking capability of the breaking current branch circuit 9 is far greater than that of the on-state current branch circuit 30. That is, the on-state current branch circuit 30 has relatively extremely small equivalent conduction resistance, and a normal line current flows through the on-state current branch circuit 30.

If a switch-off signal of the on-state current branch circuit 30 is received, the bidirectional power semiconductor switch 12 of the on-state current branch circuit 30 is switched off, so as to commutate a current commutation branch circuit and the breaking current branch circuit 9. If the current direction is the first current direction 14, a path through which the current flows is shown in FIG. 2. If the current direction is the second current direction 15, a path through which the current flows is shown in FIG. 3.

Then, a current direction of the line 44 is determined, if the current direction is the first current direction 14, the high-speed isolation switches 6 of the current commutation branch circuits B, C and the high-speed isolation switch 11 of the on-state current branch circuit 30 are switched off simultaneously, and if the current direction is the second current direction 15, the high-speed isolation switches 6 of the current commutation branch circuits A, D and the high-speed isolation switch 11 of the on-state current branch circuit 30 are switched off simultaneously.

Then if a switch-off signal of the breaking current branch circuit 9 is received, the IGBT valve group in the breaking current branch circuit is switched off simultaneously, so as to commutate the current to the nonlinear resistor 13.

When it is determined that the line current is reduced to zero, the high-speed isolation switches 6 that are in a closed state in the current commutation branch circuits A, B, C, D are switched off to complete an entire breaking process.

The foregoing embodiments are merely used to describe the technical solutions of the present invention instead of limiting them. Although after reading the present application, a person skilled in the art can make various modifications or changes by referring to the foregoing embodiments, the modifications or changes all fall within the protection scope of the claims of the present application that is filed for a grant.

What is claimed is:

1. An apparatus for breaking a line bidirectional current, comprising a breaking current branch circuit and an on-state current branch circuit, wherein the breaking current branch circuit comprises one nonlinear resistor being connected in parallel to one first power semiconductor device, or one nonlinear resistor being connected in parallel to at least two first power semiconductor devices mutually connected in series; and the on-state current branch circuit comprises at least one bidirectional power semiconductor switch being connected in series to at least one high-speed isolation switch, wherein:

the apparatus also comprises a bridge-type branch circuit, and the bridge-type branch circuit comprises two bridge arms constituted by four identical current commutation branch circuits, each current commutation branch circuit comprising at least one second power semiconductor device connected in series; every two of the four commutation branch circuits are connected in series a same direction, and the formed two bridge arms are further connected in parallel; and a connection relationship of the apparatus is selected from a group consisting of:

a) the apparatus comprises a breaking current branch circuit, an on-state current branch circuit, and a bridge-type branch circuit, wherein two ends of the on-state current branch circuit are respectively connected to bridge arm middle points of two bridge arms of the bridge-type branch circuit, and the two bridge arms are both connected in parallel to the breaking current branch circuit;

b) the apparatus comprises at least two groups of a breaking current branch circuit, an on-state current branch circuit, and a bridge-type branch circuit, wherein in each group, two ends of the on-state current branch circuit are respectively connected to bridge arm middle points of two bridge arms of the bridge-type branch circuit, and the two bridge arms are both connected in parallel to the breaking current branch circuit; and all the on-state current branch circuits are connected in series in sequence;

c) the apparatus comprises an on-state current branch circuit and at least two groups of a breaking current branch circuit and a bridge-type branch circuit, wherein in each group, two bridge arms of the bridge-type branch circuit are both connected in parallel to corresponding breaking current branch circuits, and bridge arm middle points of the bridge-type branch circuit in each group are connected in series in sequence; and two ends of the on-state current branch circuit are respectively connected to bridge arm middle points of end portions of the first bridge-type branch circuit and the last bridge-type branch circuit in the circuits connected in series; and d) the apparatus comprises an on-state current branch circuit, a bridge-type branch circuit, and at least two breaking current branch circuits, wherein after being connected in series in sequence, the respective breaking current branch circuits are further connected in parallel to two bridge arms of the bridge-type branch circuit, and two ends of the on-state current branch circuit are respectively connected to bridge arm middle points of the two bridge arms of the bridge-type branch circuit.

2. The apparatus for breaking a line bidirectional current according to claim 1, wherein: the first power semiconductor device has a capability of switching on/off a current.

3. The control method for the apparatus for breaking a line bidirectional current according to claim 2, defining that two connection points between the on-state current branch circuit and the bridge-type branch circuit in the apparatus are respectively two ends of the apparatus, and the apparatus is connected in series to a current path of a line by using the two ends, wherein: the first high-speed isolation switch and the bidirectional power semiconductor switch in the on-state current branch circuit are closed, the second power semiconductor device in the bridge-type branch circuit is closed, and the first power semiconductor device in the breaking current branch circuit is closed; and the control method comprises the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then switching off the first high-speed isolation switch of the on-state current branch circuit; and then if a switch-off signal of the breaking current branch circuit is received, switching off the first power semiconductor device in the breaking current branch circuit, so as to commutate a current to the nonlinear resistor.

4. The apparatus for breaking a line bidirectional current according to claim 1, wherein: the second power semiconductor device does not have a capability of switching on/off a current.

5. The control method for the apparatus for breaking a line bidirectional current according to claim 4, defining that two connection points between the on-state current branch circuit and the bridge-type branch circuit in the apparatus are respectively two ends of the apparatus, and the apparatus is connected in series to a current path of a line by using the two ends, wherein: the first high-speed isolation switch and the bidirectional power semiconductor switch in the on-state current branch circuit are closed, the second power semiconductor device in the bridge-type branch circuit is closed, and the first power semiconductor device in the breaking current branch circuit is closed; and the control method comprises the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then switching off the first high-speed isolation switch of the on-state current branch circuit; and then if a switch-off signal of the breaking current branch circuit is received, switching off the first power semiconductor device in the breaking current branch circuit, so as to commutate a current to the nonlinear resistor.

6. The apparatus for breaking a line bidirectional current according to claim 1, wherein: the bidirectional power semiconductor switch comprises third and fourth power semiconductor devices that are connected in parallel to each other, and directions of current switches of the third and fourth power semiconductor devices are opposite to each other.

7. The control method for the apparatus for breaking a line bidirectional current according to claim 6, defining that two connection points between the on-state current branch circuit and the bridge-type branch circuit in the apparatus are respectively two ends of the apparatus, and the apparatus is connected in series to a current path of a line by using the two ends, wherein: the first high-speed isolation switch and the bidirectional power semiconductor switch in the on-state current branch circuit are closed, the second power semiconductor device in the bridge-type branch circuit is closed, and the first power semiconductor device in the breaking current branch circuit is closed; and the control method comprises the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then switching off the first high-speed isolation switch of the on-state current branch circuit; and then if a switch-off signal of the breaking current branch circuit is received, switching off the first power semiconductor device in the breaking current branch circuit, so as to commutate a current to the nonlinear resistor.

8. The apparatus for breaking a line bidirectional current according to claim 1, wherein: the bidirectional power semiconductor switch comprises two power semiconductor devices and two diodes, wherein a fifth power semiconductor device is connected in parallel to a first diode, and directions of current switches of the two are opposite to each other; a sixth power semiconductor device is connected in parallel to a second diode, and directions of current switches of the two are opposite to each other; and the two parallel connections are connected in series, directions of the current switches of the fifth and sixth power semiconductor devices are opposite to each other, and directions of the current switches of the first and second diodes are opposite to each other.

9. The control method for the apparatus for breaking a line bidirectional current according to claim 8, defining that two connection points between the on-state current branch circuit and the bridge-type branch circuit in the apparatus are respectively two ends of the apparatus, and the apparatus is connected in series to a current path of a line by using the two ends, wherein: the first high-speed isolation switch and the bidirectional power semiconductor switch in the on-state current branch circuit are closed, the second power semiconductor device in the bridge-type branch circuit is closed, and the first power semiconductor device in the breaking current branch circuit is closed; and the control method comprises the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then switching off the first high-speed isolation switch of the on-state current branch circuit; and then if a switch-off signal of the breaking current branch circuit is received, switching off the first power semiconductor device in the breaking current branch circuit, so as to commutate a current to the nonlinear resistor.

10. The apparatus for breaking a line bidirectional current according to claim 1, wherein: the commutation branch circuit also comprises at least one second high-speed isolation switch, and the second high-speed isolation switch and the second power semiconductor device are connected in series to each other.

11. The control method for the apparatus for breaking a line bidirectional current according to claim 10, defining that two connection points between the on-state current branch circuit and the bridge-type branch circuit in the apparatus are respectively two ends of the apparatus, and the apparatus is connected in series to a current path of a line by using the two ends, wherein: the first high-speed isolation switch and the bidirectional power semiconductor switch in the on-state current branch circuit are closed, the second power semiconductor device and the second high-speed isolation switch in the bridge-type branch circuit are closed, and the first power semiconductor device in the breaking current branch circuit is closed; and the control method comprises the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then, switching off the first high-speed isolation switch of the on-state current branch circuit; determining, on a bridge arm connected to a current input end, a second power semiconductor device of a cathode directly or indirectly connected to the current input end, and switching off a second high-speed isolation switch of a commutation branch circuit on which the second power semiconductor device is located; and determining, on a bridge arm connected to a current output end, a second power semiconductor device of an anode directly or indirectly connected to the current output end, and switching off a second high-speed isolation switch of a commutation branch circuit on which the second power semiconductor device is located;

then if a switch-off signal of the breaking current branch circuit is received, switching off the first power semiconductor device in the breaking current branch circuit, so as to commutate a current to the nonlinear resistor; and switching off the second high-speed isolation switch that is in a closed state in the bridge-type branch circuit to complete an entire breaking process.

12. A control method for the apparatus for breaking a line bidirectional current according to claim 1, defining that two connection points between the on-state current branch circuit and the bridge-type branch circuit in the apparatus are respectively two ends of the apparatus, and the apparatus is connected in series to a current path of a line by using the two ends, wherein: the first high-speed isolation switch and the bidirectional power semiconductor switch in the on-state current branch circuit are closed, the second power semiconductor device in the bridge-type branch circuit is closed, and the first power semiconductor device in the breaking current branch circuit is closed; and the control method comprises the following steps:

if a switch-off signal of the on-state current branch circuit is received, switching off the bidirectional power semiconductor switch of the on-state current branch circuit, so as to commutate a current to the bridge-type branch circuit and the breaking current branch circuit;

then switching off the first high-speed isolation switch of the on-state current branch circuit; and then if a switch-off signal of the breaking current branch circuit is received, switching off the first power semiconductor device in the breaking current branch circuit, so as to commutate a current to the nonlinear resistor.

\* \* \* \* \*